(12) United States Patent
Shapiro et al.

(10) Patent No.: US 8,665,084 B2
(45) Date of Patent: Mar. 4, 2014

(54) SECURITY SYSTEM AND METHOD

(75) Inventors: Steven Shapiro, Lake Worth, FL (US); Raymond North, Boca Raton, FL (US); Timothy Albert Rader, Southlake, TX (US); Jorge Perdomo, Boca Raton, FL (US); Anne-Marie Rouse, Wellington, FL (US); James Timothy Black, Delray Beach, FL (US)

(73) Assignee: ADT US Holdings, Inc., Boca Raton, FL (US)

( * ) Notice: Subject to any disclaimer, the term of this patent is extended or adjusted under 35 U.S.C. 154(b) by 31 days.

(21) Appl. No.: 13/560,679

(22) Filed: Jul. 27, 2012

(65) Prior Publication Data

US 2013/0082835 A1 Apr. 4, 2013

Related U.S. Application Data (60) Provisional application No. 61/513,003, filed on Jul. 29, 2011.

(51) Int. Cl.
*G08B 1/08* (2006.01)

(52) U.S. Cl.
USPC ........ 340/539.1; 340/506; 340/517; 340/540; 340/541; 340/567

(58) Field of Classification Search
CPC ....................................................... B60R 25/104
USPC ........... 340/539.1–539.9, 506, 517, 540, 541, 340/567; 455/404.1, 404.2
See application file for complete search history.

(56) References Cited

U.S. PATENT DOCUMENTS

| | | | |
|---|---|---|---|
| 4,575,640 A | 3/1986 | Martin | |
| 4,908,523 A | 3/1990 | Snowden et al. | |
| 5,565,853 A | 10/1996 | Jun-Young | |
| 5,640,142 A | 6/1997 | Matatall, Jr. et al. | |
| 5,748,079 A | 5/1998 | Addy | |
| 5,801,626 A | 9/1998 | Addy | |
| 5,822,373 A | 10/1998 | Addy | |
| 5,828,300 A | 10/1998 | Addy et al. | |

(Continued)

FOREIGN PATENT DOCUMENTS

EP 1 701 475 A1 9/2006

OTHER PUBLICATIONS

International Search Report and Written Opinion dated Jan. 3, 2013 for International Application Serial No: PCT/US2012/048645, International Filing Date: Jul. 27, 2012, consisting of 12 pages.

*Primary Examiner* — Tai T Nguyen
(74) *Attorney, Agent, or Firm* — Christopher & Weisberg, P.A.

(57) ABSTRACT

A security control apparatus, system and method are provided. The security control apparatus includes a wireless communication element that supports a plurality of wireless communication protocols. The wireless communication element is configured to provide wireless communications with a user interface device and at least one premise-based device. A remote communication element is configured to provide remote communications with a monitoring center. A processor is in communication with the local wireless communication element and the remote communication element. The processor is configured to use the wireless communication element to communicate with the user interface device to receive local control and configuration data. The processor is also configured to use the remote communication element to communicate data associated with at least one of a life safety feature and life style feature with the monitoring center.

20 Claims, 6 Drawing Sheets

(56) References Cited

U.S. PATENT DOCUMENTS

| | | |
|---|---|---|
| 5,936,544 A | 8/1999 | Gonzales et al. |
| 6,026,165 A | 2/2000 | Marino et al. |
| 6,028,513 A | 2/2000 | Addy |
| 6,084,522 A | 7/2000 | Addy |
| 6,087,933 A | 7/2000 | Addy et al. |
| 6,137,402 A | 10/2000 | Marino |
| 6,150,936 A | 11/2000 | Addy |
| 6,167,137 A | 12/2000 | Marino et al. |
| 6,188,318 B1 | 2/2001 | Katz et al. |
| 6,201,472 B1 | 3/2001 | Linford et al. |
| 6,208,694 B1 | 3/2001 | Addy |
| 6,229,997 B1 | 5/2001 | Addy |
| 6,236,313 B1 | 5/2001 | Eskildsen et al. |
| 6,243,010 B1 | 6/2001 | Addy et al. |
| 6,252,501 B1 | 6/2001 | Tice et al. |
| 6,255,944 B1 | 7/2001 | Addy |
| 6,288,639 B1 | 9/2001 | Addy |
| 6,294,992 B1 | 9/2001 | Addy et al. |
| 6,326,880 B1 | 12/2001 | Tice |
| 6,351,214 B2 | 2/2002 | Eskildsen et al. |
| 6,445,291 B2 | 9/2002 | Addy et al. |
| 6,445,292 B1 | 9/2002 | Jen et al. |
| 6,462,652 B1 | 10/2002 | McCuen et al. |
| 6,472,993 B1 | 10/2002 | Addy |
| 6,593,850 B1 | 7/2003 | Addy |
| 6,603,387 B1 | 8/2003 | Addy et al. |
| 6,619,055 B1 | 9/2003 | Addy |
| 6,690,276 B1 | 2/2004 | Marino |
| 6,691,172 B1 | 2/2004 | Clow et al. |
| 6,724,316 B2 | 4/2004 | Addy et al. |
| 6,798,342 B2 | 9/2004 | Addy |
| 6,804,169 B2 | 10/2004 | Addy et al. |
| 6,868,493 B2 | 3/2005 | Orlando et al. |
| 6,928,148 B2 | 8/2005 | Simon et al. |
| 6,952,165 B2 | 10/2005 | Kovach et al. |
| 6,963,280 B2 | 11/2005 | Eskildsen |
| 6,965,313 B1 | 11/2005 | Saylor et al. |
| 6,987,450 B2 | 1/2006 | Marino et al. |
| 6,999,562 B2 | 2/2006 | Winick |
| 7,010,421 B2 | 3/2006 | Zakrewski |
| 7,081,813 B2 | 7/2006 | Winick et al. |
| 7,091,850 B2 | 8/2006 | Katz |
| 7,096,001 B2 | 8/2006 | Addy et al. |
| 7,113,090 B1 | 9/2006 | Saylor et al. |
| 7,113,099 B2 | 9/2006 | Tyroler et al. |
| 7,116,221 B2 | 10/2006 | Addy |
| 7,119,678 B2 | 10/2006 | Katz |
| 7,119,681 B2 | 10/2006 | Eskildsen |
| 7,120,795 B2 | 10/2006 | Raphael et al. |
| 7,129,831 B2 | 10/2006 | Martin et al. |
| 7,135,959 B2 | 11/2006 | Wagner et al. |
| 7,142,111 B2 | 11/2006 | Eskildsen et al. |
| 7,142,641 B2 | 11/2006 | Hinkson et al. |
| 7,145,455 B2 | 12/2006 | Eskildsen et al. |
| 7,151,461 B2 | 12/2006 | Wilson et al. |
| 7,155,485 B2 | 12/2006 | Clow et al. |
| 7,177,639 B2 | 2/2007 | Winick et al. |
| 7,183,907 B2 | 2/2007 | Simon et al. |
| 7,199,702 B2 | 4/2007 | Lizza |
| 7,248,161 B2 | 7/2007 | Spoltore et al. |
| 7,250,859 B2 | 7/2007 | Martin et al. |
| 7,286,049 B2 | 10/2007 | Martin |
| 7,292,142 B2 | 11/2007 | Simon et al. |
| 7,312,705 B2 | 12/2007 | Garavuso et al. |
| 7,319,392 B2 | 1/2008 | Babich et al. |
| 7,321,301 B2 | 1/2008 | Spoltore et al. |
| 7,321,788 B2 | 1/2008 | Addy et al. |
| 7,323,979 B2 | 1/2008 | Eskildsen |
| 7,330,109 B2 | 2/2008 | Martin |
| 7,356,429 B2 | 4/2008 | Eskildsen |
| 7,362,221 B2 | 4/2008 | Katz |
| 7,363,488 B2 | 4/2008 | Hinkson |
| 7,382,242 B2 | 6/2008 | Martin |
| 7,385,478 B2 | 6/2008 | Martin et al. |
| 7,394,359 B2 | 7/2008 | Eskildsen |
| 7,397,371 B2 | 7/2008 | Martin et al. |
| 7,400,242 B2 | 7/2008 | Martin |
| 7,403,109 B2 | 7/2008 | Martin |
| 7,423,530 B2 | 9/2008 | Babich et al. |
| 7,443,304 B2 | 10/2008 | Rowe et al. |
| 7,446,647 B2 | 11/2008 | Helgeson |
| 7,479,893 B2 | 1/2009 | Weston et al. |
| 7,518,506 B2 | 4/2009 | Lee et al. |
| 7,619,512 B2 | 11/2009 | Trundle et al. |
| 7,633,388 B2 | 12/2009 | Simon et al. |
| 7,636,039 B2 | 12/2009 | Babich |
| 7,642,910 B2 | 1/2010 | Eskildsen |
| 7,646,853 B2 | 1/2010 | Martin et al. |
| 7,651,530 B2 | 1/2010 | Winick |
| 7,675,407 B2 | 3/2010 | Yuk et al. |
| 7,679,503 B2 | 3/2010 | Mason et al. |
| 7,679,507 B2 | 3/2010 | Babich et al. |
| 7,680,283 B2 | 3/2010 | Eskildsen |
| 7,711,796 B2 | 5/2010 | Gutt et al. |
| 7,734,906 B2 | 6/2010 | Orlando et al. |
| 7,741,969 B2 | 6/2010 | Linford |
| 7,746,224 B2 | 6/2010 | Addy |
| 7,792,511 B2 | 9/2010 | Weston et al. |
| 7,796,035 B2 | 9/2010 | Hallbert et al. |
| 7,796,052 B2 | 9/2010 | Katz |
| 7,812,855 B2 | 10/2010 | Babich et al. |
| 7,818,573 B2 | 10/2010 | Martin et al. |
| 7,836,209 B2 | 11/2010 | Addy |
| 7,843,322 B2 | 11/2010 | Zakrewski et al. |
| 7,848,505 B2 | 12/2010 | Martin et al. |
| 7,852,200 B2 | 12/2010 | Romanczyk et al. |
| 7,853,199 B2 | 12/2010 | Blum |
| 7,853,200 B2 | 12/2010 | Blum et al. |
| 7,855,636 B2 | 12/2010 | Martin et al. |
| 7,856,047 B2 | 12/2010 | Wang et al. |
| 7,856,558 B2 | 12/2010 | Martin et al. |
| 7,902,977 B2 | 3/2011 | Howe |
| 7,916,018 B2 | 3/2011 | Eskildsen et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,941,182 B2 | 5/2011 | Ferro et al. |
| 7,961,091 B2 | 6/2011 | Edwards et al. |
| 7,978,069 B2 | 7/2011 | Wu |
| 7,992,199 B1 | 8/2011 | Winick et al. |
| 7,995,600 B2 | 8/2011 | Wontorcik et al. |
| 8,004,399 B2 | 8/2011 | Reyes et al. |
| 8,013,730 B2 | 9/2011 | Oh et al. |
| 8,022,807 B2 | 9/2011 | Martin et al. |
| 8,031,074 B2 | 10/2011 | Lizza |
| 8,035,516 B2 | 10/2011 | Edwards et al. |
| 8,073,931 B2 | 12/2011 | Dawes et al. |
| 8,086,702 B2 | 12/2011 | Baum et al. |
| 8,086,703 B2 | 12/2011 | Baum et al. |
| 8,122,131 B2 | 2/2012 | Baum et al. |
| 8,125,184 B2 | 2/2012 | Raji et al. |
| 8,140,048 B2 | 3/2012 | Martin et al. |
| 8,209,400 B2 | 6/2012 | Baum et al. |
| 8,214,494 B1 | 7/2012 | Slavin |
| 8,214,496 B2 | 7/2012 | Gutt et al. |
| 8,335,842 B2 | 12/2012 | Raji et al. |
| 8,350,694 B1 | 1/2013 | Trundle et al. |
| 8,350,697 B2 | 1/2013 | Trundle et al. |
| 8,395,494 B2 | 3/2013 | Trundle et al. |
| 8,451,986 B2 | 5/2013 | Cohn et al. |
| 8,456,293 B1 | 6/2013 | Trundle et al. |
| 2004/0203387 A1 | 10/2004 | Grannan |
| 2005/0128068 A1* | 6/2005 | Winick et al. ............ 340/517 |
| 2005/0216302 A1 | 9/2005 | Raji et al. |
| 2006/0230270 A1 | 10/2006 | Goffin |
| 2008/0183842 A1 | 7/2008 | Raji et al. |
| 2009/0066789 A1 | 3/2009 | Baum et al. |
| 2009/0070473 A1 | 3/2009 | Baum et al. |
| 2009/0070681 A1 | 3/2009 | Dawes et al. |
| 2009/0074184 A1 | 3/2009 | Baum et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |

(56) References Cited

U.S. PATENT DOCUMENTS

| | | |
|---|---|---|
| 2010/0023865 A1 | 1/2010 | Fulker et al. |
| 2010/0082744 A1 | 4/2010 | Raji et al. |
| 2010/0095369 A1 | 4/2010 | Gutt et al. |
| 2010/0153853 A1 | 6/2010 | Dawes et al. |
| 2010/0245107 A1 | 9/2010 | Fulker et al. |
| 2010/0277315 A1* | 11/2010 | Cohn et al. .............. 340/540 |
| 2011/0102171 A1 | 5/2011 | Raji et al. |
| 2011/0128378 A1 | 6/2011 | Raji |
| 2011/0248857 A1 | 10/2011 | Rutherford et al. |
| 2012/0062026 A1 | 3/2012 | Raji et al. |
| 2012/0066608 A1 | 3/2012 | Sundermeyer et al. |
| 2012/0066632 A1 | 3/2012 | Sundermeyer et al. |
| 2012/0260184 A1 | 10/2012 | Dawes et al. |
| 2012/0278453 A1 | 11/2012 | Baum et al. |
| 2012/0278877 A1 | 11/2012 | Baum et al. |
| 2012/0324566 A1 | 12/2012 | Baum et al. |
| 2012/0331109 A1 | 12/2012 | Baum et al. |
| 2013/0062951 A1 | 3/2013 | Raji et al. |

* cited by examiner

SECURITY SYSTEM AND METHOD

CROSS-REFERENCE TO RELATED APPLICATION

This application is related to and claims priority to U.S. Provisional Application Ser. No. 61/513,003, filed Jul. 29, 2011, entitled "TOTAL SITE SECURITY AND CONTROL", the entirety of which is incorporated herein by reference.

FIELD OF THE INVENTION

The invention relates to security systems and in particular to security system control using wireless communication.

BACKGROUND OF THE INVENTION

The demand for security systems that monitor homes and businesses for alarm conditions has continued to grow as more home and business owners seek to protect their premises from various hazards and threats. Such hazards and threats include intrusion, fire, carbon monoxide and flooding, among others dangers that may be monitored and reported to a monitoring station.

Conventional security systems typically employ a wall-mounted control panel (typically mounted in a less accessible area of a home) that receives information from various sensors, and may trigger alarms based on the received information. These triggered alarms are then reported by the control panel to a monitoring center via a plain old telephone service (POTS) line, digital subscriber line (DSL), or cellular radio, such that the monitoring center can take appropriate action. However, installation and servicing complexity associated with these systems tends to be high as an installer has to physically mount the control panel onto the wall and configure the various sensors. These systems also typically incorporate a manufacturer's specific technology designed for the manufacturer's security application, and are thus limited for use only with certain life safety type devices such as door and window contacts, smoke detectors, motion detectors, etc. This is true as well for more recent all-in-one (AIO) security systems, in which the control panel and a user interface (such as a keypad) are combined in a single unit. To reduce some of the cost associated with installation of such systems, portable AIO systems have been implemented so that the unit that may be relocated around the premise and not permanently installed. For example, the unit may sit on top of a table or on the floor, but communicates with life safety sensors in a similar manner as a wall-mounted security panel.

While the complexity of portable AIO systems is less than more conventional security panels installations, portable AIO systems may be more vulnerable to damage and tampering. For example, portable AIO systems are often located near an entrance or exit, and even chirp when a sensor is activated or to remind a homeowner to disarm the system—announcing its location. A thief may break into a residence protected by a portable AIO in which the thief may be able to destroy/disable the portable AIO system and prevent the AIO system from triggering an alarm. The phenomenon of a thief breaking in and disabling the portable AIO system control panel is referred to as "crash and smash" and is a growing problem.

While a homeowner may take measures to prevent "crash and smash" by hiding the portable AIO system in a remote closet or back room, such a location is often not practical because the home or business owner still needs access to the portable AIO system in order to arm/disarm or otherwise control the system via the built-in keypad. For example, the business owner may be forced to initiate arming of the portable AIO system located in a backroom and then run to exit the premises before the system is armed. In other words, while portable AIO systems may be less complex than more conventional wall-mounted security panels, they are also more vulnerable to tampering and disablement.

Another issue associated with some portable AIO systems is that these systems are designed to operate using only the built-in user interface. If the control panel becomes damaged, due to weather or tampering by a thief, the system may be rendered inoperable. Also, a single point of control on the premise makes configuration of the system more difficult as an installer often has to go back and forth between the control panel and various sensors during installation to configure the sensors.

Moreover, both portable AIO security systems and conventional security panels are typically limited to controlling and monitoring life safety, such as intrusion and fire detection. But today, home or business owners want to utilize additional life style features (such as lighting control, temperature control and remote viewing of video). Such life style systems operate in a manner that has developed largely independent of life safety systems. For example, the life style devices provide different types of event information and are typically operated and managed through a different provider and/or remote system than those used for monitoring life safety. Consequently, in order to add this lifestyle capability, users have to have completely separate hardware/software/service directed to controlling and monitoring these additional features, with a separate user interface dedicated solely to controlling the separate system.

SUMMARY OF THE INVENTION

The invention advantageously provides a method and system for security control management.

According to one embodiment, a security control apparatus is provided. The security control apparatus includes a wireless communication element that supports a plurality of wireless communication protocols. The wireless communication element is configured to provide wireless communications with a user interface device and at least one premise-based device. The security control apparatus includes a remote communication element configured to provide remote communications with a monitoring center. The security control apparatus includes a processor in communication with the local wireless communication element and the remote communication element. The processor is configured to use the wireless communication element to communicate with the user interface device to receive local control and configuration data. The processor is also configured to use the remote communication element to communicate data associated with at least one of a life safety feature and life style feature with the monitoring center.

According to another embodiment, a system is provided that includes a user interface device in which the user interface device is configured to communicate local control data and configuration data, and a security control device in communication with the user interface device. The security control device includes a communication subsystem that provides a plurality of communication protocols and is arranged to provide wireless communications with the user interface device and a premise-based device. The communication subsystem is further arranged provide remote communications with a remote monitoring center. The security control device includes a processor configured to use the communication subsystem to communicate with the user interface device to receive the local control and configuration data. The processor is further configured to use the communication subsystem to communicate data associated with at least one of a life safety feature and life style feature with the remote monitoring center.

According to yet another embodiment, a portable user interface device for use with a security control unit is provided. The user interface device includes a siren that is configured to provide an audible alarm. The user interface device also includes a power supply that is configured to power the portable user interface device. The user interface device also includes a processor that is configured to trigger the siren upon occurrence of a triggering condition.

According to yet another embodiment, a method for controlling features of a security system is provided. The security system includes a security control device in communication with a user interface device in which the security control device includes a communication subsystem that provides a plurality of communication protocols. The communication subsystem is arranged to provide wireless communications with the user interface device and provide remote communications with remote monitoring center. The communication subsystem is used to communicate with the user interface device to receive local control and configuration data. The communication subsystem is used to communicate data associated with at least one of a life safety feature and life style feature with the remote monitoring center.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION OF THE INVENTION

The invention advantageously provides a system, device and method for a security control management. Accordingly, the system, device and method components have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
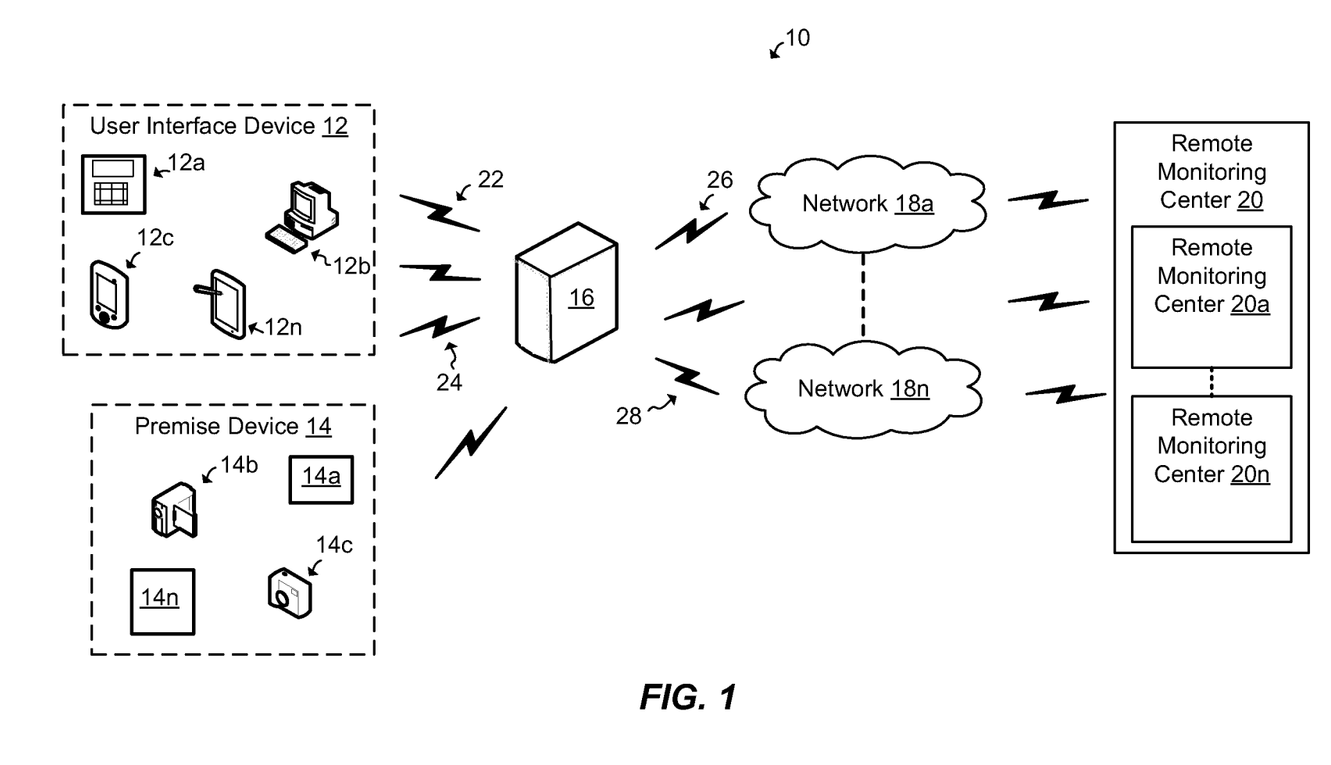
FIG. 1 is a block diagram of a security control system for security control management, constructed in accordance with the principles of the invention.

Referring now to the drawing figures in which like reference designators refer to like elements there is shown in FIG. 1 a security control system constructed in accordance with the principles of the invention and designated generally as "10." System 10 may include one or more user interface devices 12a to 12n (collectively referred to as "user interface device 12"), one or more premise devices 14a to 14n (collectively referred to as "premise device 14"), security control unit 16, one or more networks 18a to 18n (collectively referred to as "network 18") and one or more remote monitoring centers 20a to 20n (collectively referred to as "remote monitoring center 20"), communicating with each other.

User interface device 12 may be a wireless device that allows a user to communicate with security control unit 16. User interface device 12 may be a portable control keypad/interface 12a, computer 12b, mobile phone 12c and tablet 12n, among other devices that allow a user to interface with security control unit 16. User interface device 12 may communicate at least with security control unit 16 using one or more wireless communication protocols well known to those of ordinary skill in the art. For example, portable control keypad 12a may communicate with security control unit 16 via a ZigBee based communication link 22, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. User interface device 12 is discussed in detail with respect to FIG. 3.

Premise devices 14 may include one or more types of sensors, control and/or image capture devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premise setting such as lighting, temperature, energy usage, door lock and power settings, among other settings associated with the premise or devices on the premise. Image capture devices may include a digital camera and/or video camera, among other image captures devices that are well known in the art. Premise device 14 may communicate with security control unit 16 via proprietary wireless communication protocols and may also use Wi-Fi, both of which are known in the art. Those of ordinary skill in the art will also appreciate that various additional sensors and control and/or image capture devices may relate to life safety or life style depending on both what the sensors, control and image capture devices do and how these sensors, control and image devices are used by system 10. One of the advantages of the invention is the ability to use any of these devices irrespective of whether they are life safety or life style.

Security control unit 16 may provide management functions such as power management, premise device management and alarm management, among other functions. In particular, security control unit 16 may manage one or more life safety and life style features. Life safety features may correspond to security system functions and settings associated with premise conditions that may result in life threatening harm to a person such as carbon monoxide detection and intrusion detection. Life style features may correspond to security system functions and settings associated with video capturing devices and non-life threatening conditions of the premise such as lighting and thermostat functions. Exemplary security control unit 16 components and functions are described detail with respect to FIG. 2.

Security control unit 16 may communicate with network 18 via one or more communication links. In particular, the communications links may be broadband communication links such as a wired cable modem or Ethernet communication link 26, and digital cellular communication link 28, e.g., long term evolution (LTE) based link, among other broadband communication links known in the art. Broadband as used herein may refer to a communication link other than a plain old telephone service (POTS) line. Ethernet communication link 26 may be an IEEE 802.3 based communication link. Network 18 may be a wide area network, local area network, wireless local network and metropolitan area network, among other networks known in the art. Network 18 provides communications between security control unit 16 and remote monitoring center 20.

System 10 may include remote monitoring center 20 that is capable of performing monitoring, configuration and/or control functions associated with security control unit 16. For example, remote monitoring center 20 may include a remote life safety monitoring center that monitors life safety features associated with security control unit 16 in which the remote monitoring center 20 receives life safety data from security control unit 16. For example, with respect to fire and carbon monoxide detectors/sensors, life safety data may include at least one carbon monoxide readings, smoke detection reading, sensor location and time of reading, among other related to these detectors that may be communicated with remote monitoring center 20. In yet another example, with respect to a door contact detector, life safety data may include at least one of sensor location and time of detection, among other data related to the door contact detection that may be communicated with remote monitoring center 20.

Alarm event data from the premises may be used by the remote monitoring center in running through various life safety response processes in notifying the owner of the premises, determining whether an actual alarm event is occurring at the premises, and notifying any appropriate response agency (e.g., police, fire, emergency response).

The same or separate remote monitoring center 20 may also include a life style system/service that allows for various life style features associated with security control 16. The remote life style system may receive life style data from security control unit 16. For example, with respect to temperature control, life safety data may include thermostat readings. In yet another example, with respect to video capture devices, life style data may include at least one of captured images, video, time of video capture and video location, among other data related to video capture devices that may be communicate with remote monitoring center 20. Remote monitoring center 20 may also provide updates to security control unit 16 such as updates to features associated with life safety and/or life style operating system. Those of ordinary skill in the art will appreciate that video and other data may also be used by the life safety monitoring center.

Figure 2:
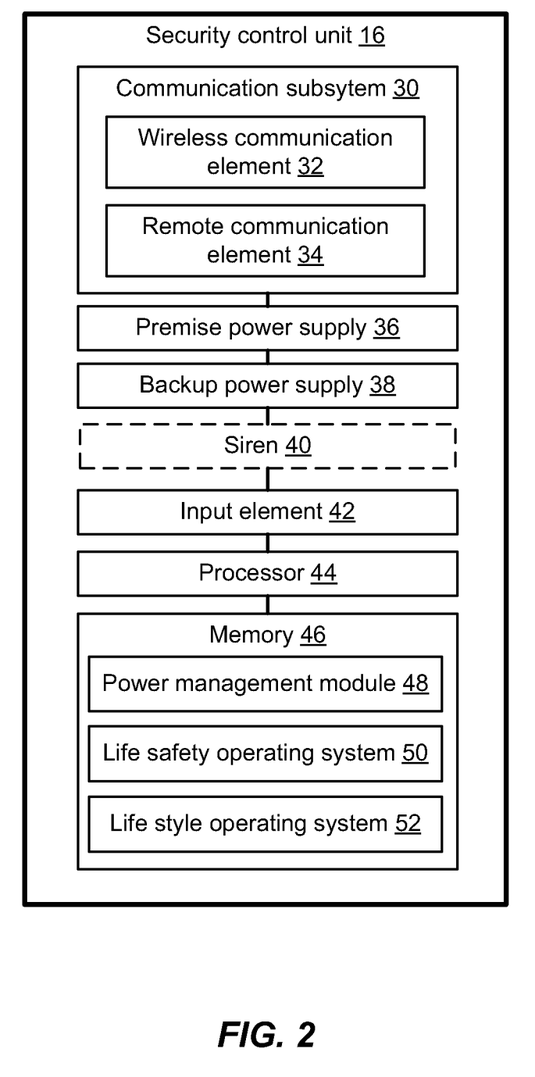
FIG. 2 is a block diagram of a security control unit constructed in accordance with the principles of the invention.

An exemplary security control unit 16 for managing a premise security system is described with reference to FIG. 2. Security control unit 16 may include communication subsystem 30 that is configured to provide communications with user interface device 12, premise device 14 and network 18. In particular, communication subsystem 30 may include wireless communication element 32 and remote communication element 34. Wireless communication element 32 provides wireless communication with user interface device 12 and premise device 14. Wireless communication element 32 may support one or more wireless communication protocols such as ZigBee, Z-wave and Wi-Fi, e.g., IEEE 802.11, among others wireless communications protocols that support wireless data transfer.

Wireless communication element 32 may be composed of one or more hardware components in which each hardware component is configured to provide wireless communication using a specific protocol. For example, wireless communication element 32 may include a ZigBee hardware component configured to provide ZigBee based communications and a Z-wave hardware component configured to provide Z-wave based communications. The hardware components associated with wireless communication element 32 may be internal components within security control unit 16 such that these features are built-in or standard features. Alternatively, any one or more of the hardware components associated with wireless communication element 32 may be external components that may be replaced by a user, homeowner or installer. For example, the ZigBee and Z-wave hardware component modules may be internal components while the Wi-Fi hardware component may be an external component that allows for upgrading. Wireless communication element 32 may broadcast a wireless signal so that user interface device 12 may connect directly to security control unit 16. For example, wireless communication element 32 may provide a Wi-Fi encrypted service set identifier (SSID) and path for communication with multiple user interface devices 12.

By supporting a plurality of wireless communication protocols, wireless communication element 32 enables security control unit 16 to be used with a variety of user interface devices 12 and premise devices 12 that are designed to work using only a specific wireless communication protocol. Supporting a plurality of wireless communication protocols allows easy upgrading of existing user interface device 12 and premise device 14, and for security control unit 16 integration with various equipment venders that may incorporate different wireless protocols. Wireless communication element 32 may provide two-way voice communication with user interface device 12, which is then communicated with remote monitoring center 20. For example, wireless communication element 32 may support voice over internet protocol (VoIP) based communications. In one embodiment, component parts of wireless communication element 32, e.g., an IEEE 802.11 communication module, may also be past of remote communication element so that the wireless communication protocols, e.g., IEEE 802.11 protocols, can be used to communicate with remote monitoring center 20. In other words, one or more specific communication modules of wireless communication element 32 can also be part of remote communication element 34.

Remote communication element 34 is configured to provide broadband communications with remote monitoring center 20 via network 18. For example, remote communication element 34 may be an Ethernet based hardware component that provides communication with network 18. Alternatively or in addition to Ethernet based hardware component, remote communication element 34 may include a Wi-Fi (IEEE 802.11) hardware component that provides communication with a home or other premise network, e.g., a home wireless network, and may utilize some of the same components as wireless communication element 32. The remote communication element 34 may also include a cellular radio hardware component that provides communications with at least one cellular network such as an LTE based cellular network. Security control unit 16 may use Ethernet communication link 26 as a primary communication link such that the cellular communication link is used for broadband communications when the Ethernet or primary communication link is not functioning properly such as during a power outage where a home network is unavailable, i.e., home network router has no power.

Security control unit 16 may include premise power supply 36 that is configured to provide power to security control unit 16. For example, premise power supply 36 may provide power to security control unit 16 via a home alternating current (AC) power outlet or other power outlets that are known in the art. Premise power supply 36 may be a primary power supply such that security control unit 16 operates using power from the premise power supply 36 when available. Security control unit 16 may also include back-up power supply 38 that provides power during premise power supply failure. Back-up power supply 38 may include one or more disposable or rechargeable batteries that are configured to provide enough power to operate security control unit 16 for first predetermined amount of time and activate siren 40 for a second predetermined amount of time, e.g., a user can access the security system for at least twenty-four hours while security control unit 16 is power by back-up power supply 38 while the siren can be activated and operate after the twenty-four hour period.

Siren 40 may be an eighty-five decibel (dB) siren, among other audible devices known in the art. Siren 40 may be an optional component in security control unit 16 such that audible alerts are generated by user interface device 12, e.g., portable control keypad/interface 12a, and not security control unit 16. Moreover, security control unit 16 may include at least one universal serial bus port (USB) to receive power from a laptop or other device with a USB interface. Other port types capable of providing power to security control unit 16 may be used based on design need.

Input element 42 may be configured to receive input data from a user. For example, input element 42 may be a ten number keypad that enables a user to arm and disarm system 10. Input element 42 allows for an alternative or back-up way of arming and disarming system when no user interface device 12 is available to a user. Other input elements may be used as are known in the art. Security control unit 16 may include one or more indicators such as light emitting diodes (LEDs) that may indicate the status of security control unit 16. For example, a first LED is turned on when security control panel is powered, a second LED is turned on when the system is armed or disarmed, a third LED is turned on when an internet protocol connection is connected, a fourth LED may be turned on when the cellular connection has sufficient strength and the first LED may flash during low power conditions, among other LED and LED on/off may be used based on design need. Processor 44 may be a central processing unit (CPU) that executes computer program instructions stored in memory 46 to perform the functions described herein.

Memory 46 may include non-volatile and volatile memory. For example, non-volatile memory may include a hard drive, memory stick, flash memory and the like. Also, volatile memory may include random access memory and others known in the art. Memory 46 may store power management module 48, life safety operating system 50 and life style operating system 52, among other data and/or modules. Power management module 48 includes instructions, which when executed by processor 44, causes processor 44 to perform the process described herein, such as the power management process, discussed in detail with reference to FIG. 5. Life safety operating system is configured to provide life safety features associated with system 10. Life style operating system 52 is configured to provide life style features associated with system 10. In particular, processor 44 is configured to run both life safety operating system 50 and life style operating system 52 such that separate processors are not needed to run both operating systems. This single processor configuration reduces cost while still providing both life safety and life style features.

Memory 46 may include a Wi-Fi high-jacking module (not shown) that varies security control unit 16 settings when processor determines an unauthorized has connected to security control unit 16 via Wi-Fi. For example, Wi-Fi high-jacking module may shutdown Wi-Fi and/or move to low power RF such that user interface device 12 and/or premise device 14 can still communicate with security control panel. Memory 46 may include an auto enrollment module (not shown) that is configured to cause processor 44 to search, wirelessly, for user interface device 12 and premise device 14 located within or near the premise. The auto enrollment module may cause processor 44 to forward information associated with the found devices 12 and 14 to remote monitoring center 20 such that remote monitoring center 20 may push enrollment data to security control unit 16 to facilitate configuration. Security control unit 16 may use the enrollment data configured the security system such that the system operates using the found devices 12 and/14. Auto enrollment module reduces installation time as the devices 12 and/14 are automatically found and enrolled for use by security control unit 16.

Figure 3:
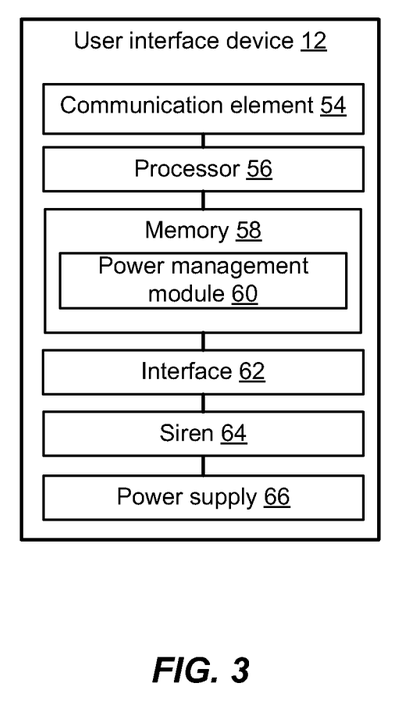
FIG. 3 is a block diagram of a user interface device constructed in accordance with the principles of the invention.

An exemplary user interface device 12 for providing local control and configuration data is described with reference to FIG. 3. User interface device 12 may include a portable control keypad/interface 12a, personal computer 12b, mobile device 12c and tablet computer 12n, among other devices. User interface device 12 includes communication element 54 that is configured to communicate with security control unit 16 via at least one wireless communication protocol such as ZigBee, Z-wave and Wi-Fi, among other protocols known in the art. User interface device 12 may include processor 56 and memory 58 that correspond to security control unit 16 components, with size and performance being adjusted based on design need. Processor 56 performs the functions described herein with respect to user interface device 12.

Figure 6:
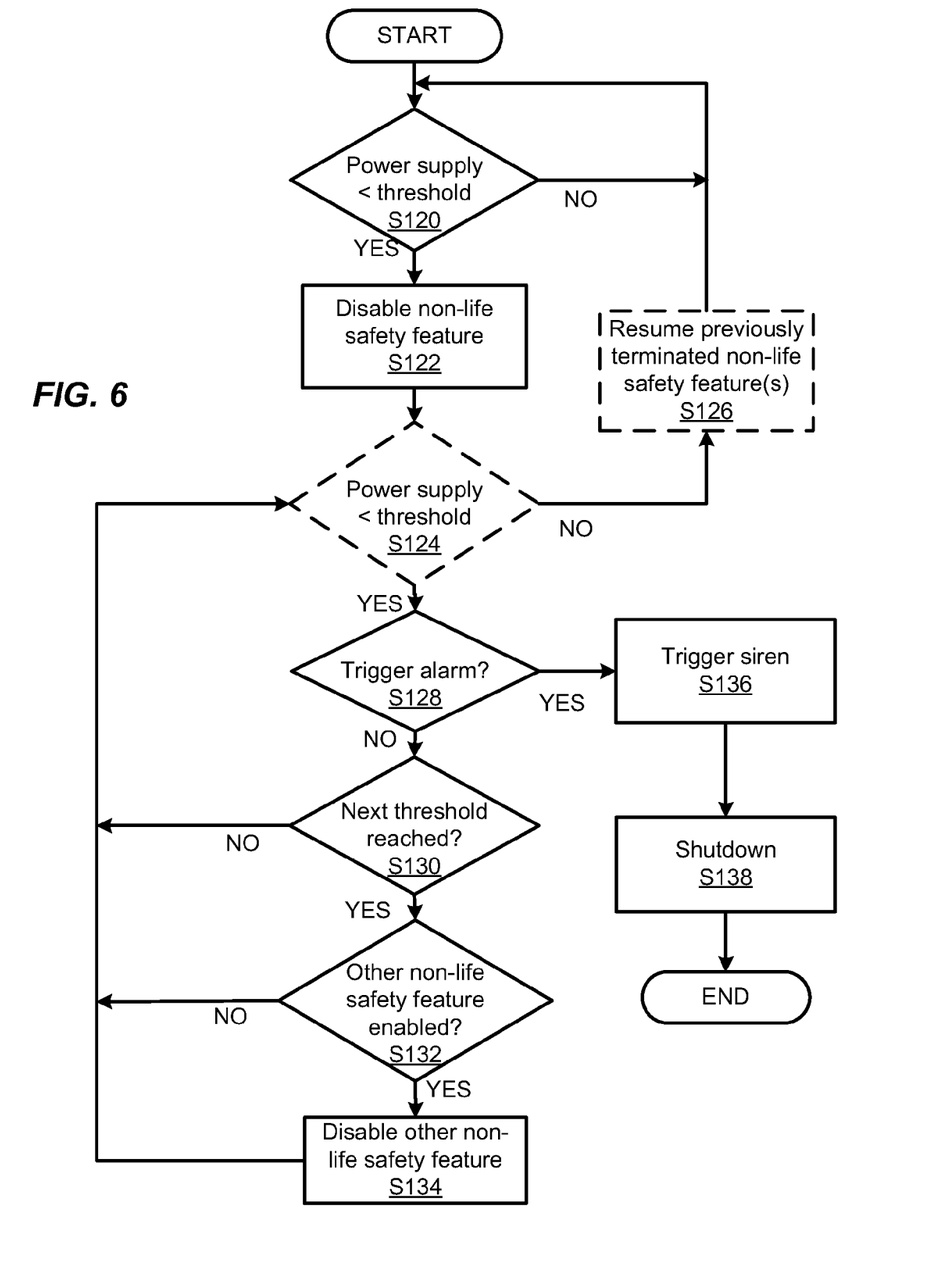
FIG. 6 is a flow chart of an exemplary user interface device power management process of the invention, constructed in accordance with the principles of the invention.

Memory 58 may include power management module 60 in which power management module 60 includes instructions, which when executed by processor 56, causes processor 56 to perform the process described herein, such as the power management process, discussed with respect to FIG. 6. Memory 58 may store other modules and data based on design need. Interface 62 may be user interface configured to receive user inputs. For example, interface 62 may receive local control and configuration data input from user.

User interface device 12 may include siren 64 such as an eighty-five dB siren or other audible device(s) known in the art. User interface device 12 may include power supply 66 for supplying power to user interface device 12. Power supply 66 may include one or more rechargeable and/or disposable batteries, among other types of batteries that are well known in the art. Moreover, user interface device 12 may be powered via a universal serial bus (USB), have an interface that allows the connection of an external power adapter/recharger, and/or other connection type.

Figure 4:
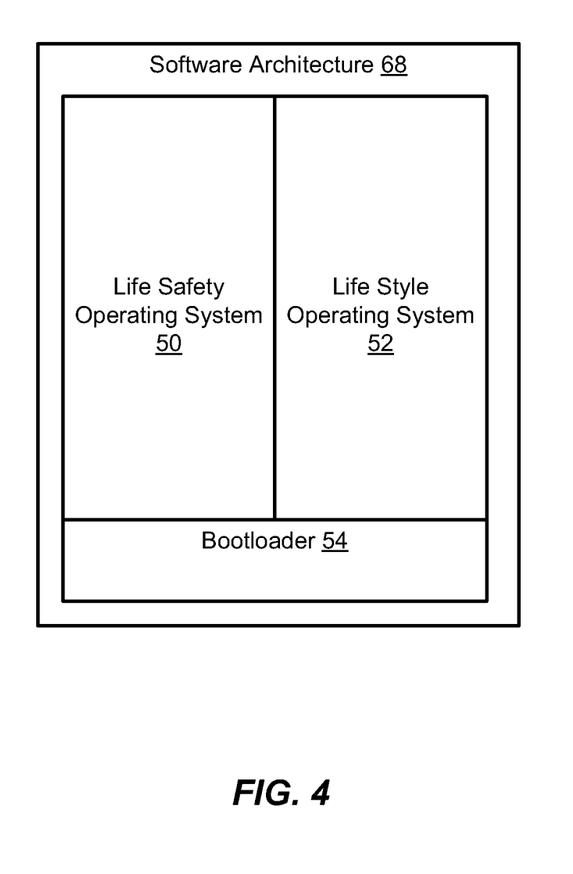
FIG. 4 is a block diagram of a software architecture of the security control unit, constructed in accordance with the principles of the invention.

Exemplary software architecture 68 of security control unit 16 is described with reference to FIG. 4. In particular, software architecture 68 may include life safety operating system 50, life style operating system 52 and bootloader 54, among other software components relates to security feature management and operation of security control unit 16. Life safety operating system 50 and life style operating system 52 are configured to run in security control unit 16 in which the life safety operating system 50 and life style operating system 52 run in a virtual machine configuration. The virtual machine configuration allows a single processor such as processor 44 to separately run the life safety operating system 50 while updating life style operating 52 without negatively affecting features associated with life safety operating system 50, i.e., life safety features remain functioning while life style features are updated. The converse is also contemplated. Bootloader 54 is used to load the run time environment for operating systems 50 and 52.

Figure 5:
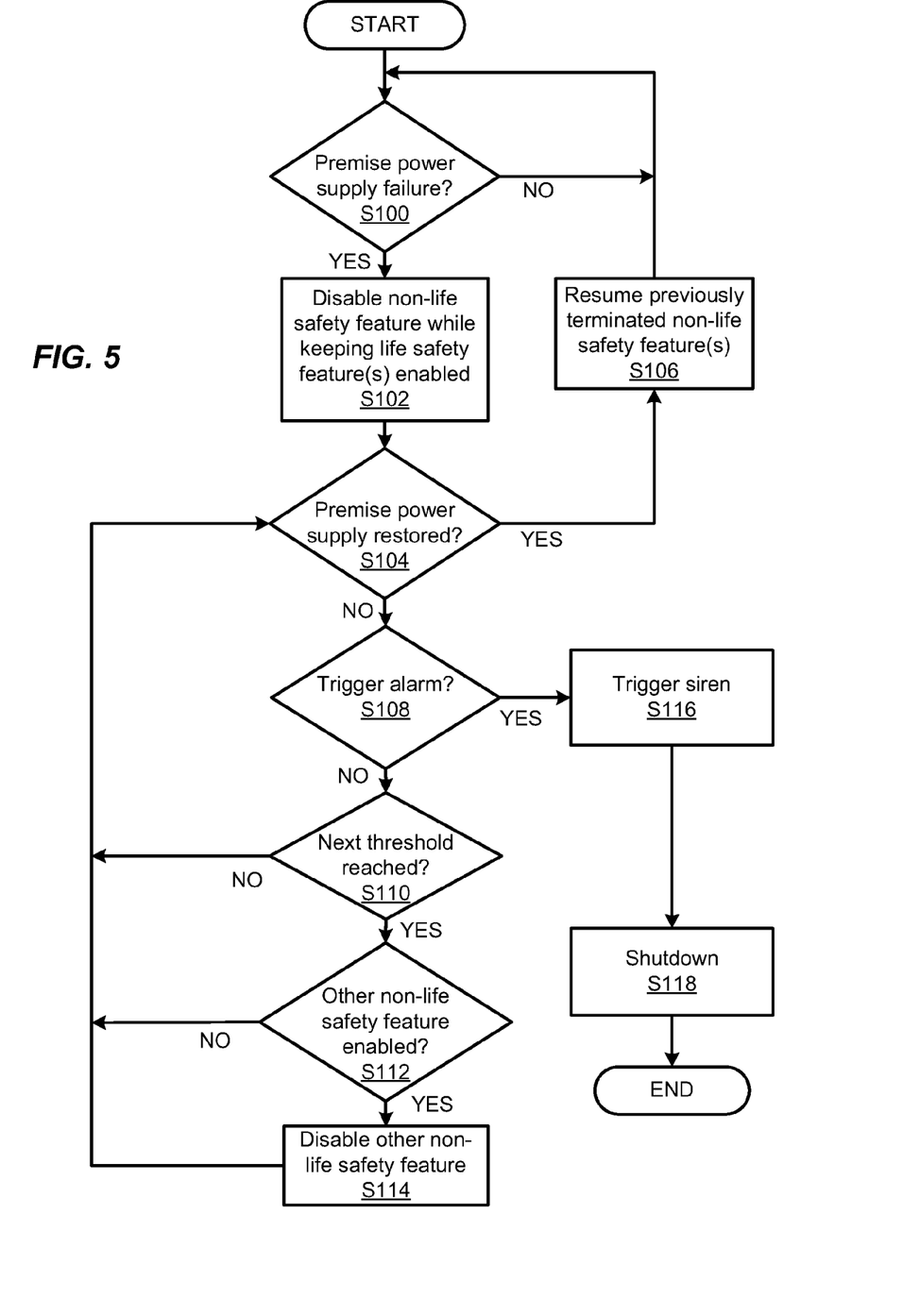
FIG. 5 is a flow chart of an exemplary security control unit power management process of the invention, constructed in accordance with the principles of the invention.

An exemplary power management process is illustrated in FIG. 5. The power management process relates to managing a security system based at least in part on the monitoring of premise power supply 36 and back-up power supply 38. Processor 44 determines whether premise power supply 36 has failed (Block S100). For example, processor 44 may monitor the power being provided by premise power supply 36 using well known methods in the art to determine whether power failure has occurred. Power failure may occur when the voltage being supplied by premise power supply 36 falls below a predefined voltage threshold. If processor 44 determines a power failure has not occurred, the determination of Block S100 may be repeated.

If the determination is made that premise power supply 36 is in a power failure condition, processor 44 disables a non-life safety feature such as a life style feature, while keeping the life safety feature(s) enabled (Block S102). For example, the temperature control feature associated with the life style operating system may be disabled while keeping the intrusion detection, fire detection and carbon monoxide detection features associated with life safety operating system 50 enabled. Power management module 48 advantageously allows non-life safety features such as life style features associated with life style operating system 50 to be disabled without interrupting life safety features associated with life safety operating system 52. This configuration helps ensure life safety features will remain enabled during premise power supply 36 failure while at the same time reducing power consumed by disabling a non-life style feature. For example, some life style features may require or attempt to initiate communication with user interface device 12 and/or remote monitoring center 20 in which such communications consume power, i.e., may consume limited back-up power. Other non-life style features that may be disabled include turning off any security control device LEDs and/or terminating communications to user interface device 12 while maintaining communications with premise devices. Therefore, disabling at least one non-life safety feature reduces the amount of power consumed by security control unit 16 in which the more non-life safety features that are disabled, the greater the power savings.

Processor 44 determines whether premise power supply 36 has been restored based at least in part on the monitoring of premise power supply 36 (Block S104). For example, processor 44 may continually or periodically monitor the power level of premise power supply 36 to determine whether the power level is equal to or above the predetermined voltage threshold. If processor 44 determines premise power supply 36 has been restored, processor 44 may resume or enable the previously disabled non-life safety feature(s) (Block S106). In other words, the power management process enables non-life safety features such as life style features that may consume more power once security control device 16 is being power by premise power supply 36 such that the non-life safety features consume minimal power from the back-up power supply 38.

If the determination is made that power of premise power supply 36 has not been restored, a determination is made whether to trigger an alarm such as an audible alarm (Block S108). In particular, an audible alarm may be trigger after processor 44 determines security control unit 16 has been operating on back-up power supply 38 for a predetermined amount of time, e.g., twenty-four hours. The predetermined amount of time may be based on design need and/or regulatory requirements. If the determination is made to trigger an alarm, siren 40 or siren 64 may be triggered for a predetermined amount of time (Block S116). In one embodiment, processor 44 uses communication subsystem 30 to send a siren trigger message to user interface device 12 to trigger siren 64 in user interface device 12. For example, siren 64 may be triggered for at least four minutes in order to alert a user of a security control unit 16 status such as loss of all power. The predetermined amount of time the alarm is triggered may be based on design need and/or regulatory requirements. Other criteria may be used to trigger an audible alarm based on design need. After triggering siren 64, security control unit 16 may shut down (Block S118). For example, security control unit 16 may perform a graceful shutdown according to a shutdown routine when the back-up power supply 38 reaches a predefined threshold such as ten percent power remaining.

Referring back to Block S108, if processor 44 makes the determination not to trigger an alarm, processor 44 determines whether an available power threshold has been reached (Block S110). The power threshold may correspond to a back-up power supply 38 level at which another non-life safety feature may be shutdown in order to reduce power consumption. For example, a different non-life safety feature may be terminated every time the power level falls by a predetermined amount such as five or ten percent or to a predetermined level. Moreover, one or more non-life safety features may be terminated at a time. If the determination is made that the feature threshold is not reached, the determination of Block S104 may be repeated.

If the determination is made that the power threshold has been reached, processor 44 determines whether at least one other non-life safety feature, e.g., life style feature, is enabled (Block S112). For example, a lighting life style feature may have been previously been disabled in Block S102 but a temperature life style feature remains enabled. If the determination is made that at least one other non-life safety feature is not enabled, the determination of Block S104 may be repeated. If processor 44 determines at least one other non-life safety feature is enabled, processor 44 disables the at least one other non-life safety feature such that the non-life safety features consume less power from the back-up power supply 38 (Block S114). The order of which non-life safety features are disabled may vary based on design need and power consumption of individual features or other criteria. After disabling the at least one other non-life safety feature, the determination of Block S104 may be repeated. The power management process helps ensure more important or safety-dependent features stay powered by terminating or disabling less important features such as life style features. Alternatively, processor 44 may disable more than one or all non-life safety features at one time.

An exemplary power management process for user interface device 12 is illustrated in FIG. 6. The power management process relates to managing user interface device 12 features based at least in part on the monitoring of power supply 66. For example, processor 56 may monitor the power being provided by power supply 66 using well known methods in the art. Processor 56 determines whether the power being supplied by power supply 66 drops below a predefined threshold based at least in part on the monitoring, i.e., whether a power supply 66 voltage or power level is less than a threshold (Block S120). The threshold may be a power and/or voltage level determined based on design need and/or other factors. If processor 56 determines power supply 66 is not below, i.e., greater than or equal to, a predetermined threshold, the determination of Block S120 may be repeated.

If the determination is made that the power supply 66 is below the predetermined threshold, processor 56 disables at least one non-safety feature while keeping life safety feature(s) enabled at user interface device 12 (Block S122). For example, processor 56 may disable a life style feature such that less power may be consumed by not having to perform processing, communication and/or other functions associated with the disabled feature. Other non-safety features may include a backlight keypad and/or display feature. Therefore, disabling at least one non-life safety feature reduces the amount of power consumed by user interface device 12 such that the more non-safety features that are disabled, the greater the power savings.

After at least one non-life safety has been disabled, processor 56 may determine whether power supply 66 is still below the threshold based at least in part on the monitoring (Block S124). For example, processor 56 may continually or periodically monitor the voltage level of power supply 66. If the determination is made that power supply 66 is not below the threshold (i.e., is greater than or equal to the threshold), processor 56 may resume the previously disabled or terminated non-safety feature(s) (Block S126). In other words, the power management process of FIG. 6 enables or executes the previously disabled non-life safety feature(s) that may consume more power once power supply 66 is greater than or equal to the threshold such that the non-life safety features consume minimal power from power supply 66. Power supply 66 may rise back to the predetermined threshold level when power supply 66 is being recharged and/or when user interface device 12 is being power via USB, among other situations where power supply 66 is no longer below the predetermined threshold. Alternatively, Blocks S124 and S126 may be skipped or excluded from the power management process of FIG. 6 based on design need, i.e., the process moves from Block S122 directly to Block S128.

If the determination is made that power supply 66 is below threshold, processor 56 determines whether to trigger an alarm such as an audible alarm (Block S128). In particular, an audible alarm may be trigger after processor 56 determines power supply 66 has reached a lower predetermined threshold. For example, the lower predetermined threshold may correspond to a minimum power level needed to trigger siren 64 for a predetermined amount of time and/or shutdown user interface device 12. The lower predetermined threshold may be based on design need. If the determination is made to trigger an alarm, siren 64 and/or siren 40 may be triggered for a predetermined amount of time (Block S136). For example, siren 64 may be triggered for at least four minutes in order to alert a user of user interface device 12 status such as a loss of all power status. The predetermined amount of time the alarm is triggered may be based on design need and/or regulatory requirements. Other criteria may be used to trigger an audible alarm based on design need. After triggering siren 64, user interface device 12 may shut down (Block S138). For example, security control unit 16 may perform a graceful shutdown according to a shutdown routine.

Referring back to Block S128, if the determination is made not to trigger an alarm, processor 56 determines whether a feature threshold has been reached (Block S130). The feature threshold may correspond to a back-up power supply 38 level at which another feature may be shutdown in order to reduce power consumption. For example, a difference feature may be terminated every time the power level fails another predetermined amount, e.g., five or ten percent. Moreover, more than one feature may be disabled or terminated at a time. If the determination is made that the feature threshold is not reached, the determination of Step S124 may be repeated. Alternatively, if Block S124 is skipped or excluded from the process and the determination is made that the feature threshold not been reached, the determination of Block S128 may be performed.

If the determination is made that the feature threshold is reach, processor 56 determines whether at least one other non-life safety feature is enabled (Block S132). If the determination is made that at least one other non-life safety feature is not enabled, the determination of Block S124 may be repeated. Alternatively, if Block S124 is skipped or excluded from the process and the determination is made that at least one other non-life-style feature is not enabled, the determination of Block S128 may be repeated, i.e., the process moves from Block S132 to Block S128. If processor 56 determines at least one other non-life safety feature is enabled, processor 56 disables the at least one other life style feature such that the non-life safety features consume less power from power supply 66 (Block S134). The order of which non-life safety features are disabled may vary based on design need and power consumption of individual features or other criteria.

After disabling the at least one other non-life style feature, the determination of Block S124 may be repeated. Alternatively, if Block S124 is skipped or excluded from the process and the other non-life safety feature has been disabled at Block S134, the determination of Block S128 may be repeated, i.e., the process moves from Block S134 to Block S128. The power management process helps ensure more important or safety dependent features remain operating by terminating or disabling less important features such as life style features or other non-safety features at user interface device 12. Alternatively, processor 56 may disable more than one or all life style features at one time. In one embodiment, the power management is configured and power supply 66 sized such that processor 56 can still trigger and sound siren 64 for four minutes after a twenty-four hour period upon the occurrence of a triggering condition, e.g., low battery, sensor trigger detection, receipt of trigger message from security control unit 16, etc.

The invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A security control apparatus, comprising:
    a wireless communication element supporting a plurality of wireless communication protocols, the wireless communication element configured to provide wireless communications with a user interface device and at least one premise-based device;
    a remote communication element configured to provide remote communications with a monitoring center;
    a premise power supply, the premise power supply configured to supply power to the security control apparatus;
    a back-up power supply, the back-up supply configured to provide power to the security control apparatus during failure of the premise power supply; and
    a processor in communication with the local wireless communication element and the remote communication element, the processor configured to:
        use the wireless communication element to communicate with the user interface device to receive local control and configuration data;
        use the remote communication element to communicate data associated with at least one of a life safety feature and life style feature with the monitoring center;
        execute at least one life safety feature and at least one life style feature;
        monitor the premise power supply; and
        disable the at least one life style feature based at least in part on the monitoring.

2. The security control apparatus of claim 1, wherein the at least one life style feature is disabled when the monitoring indicates power failure of the premise power supply.

3. The security control apparatus of claim 1, wherein the at least one life safety feature remains enabled while the at least one life style feature is disabled.

4. The security control apparatus of claim 1, wherein the executed at least one life style feature includes executing a plurality of life style features; and
    the disablement of the at least one life style feature occurs selectively from among the plurality of life style features based at least in part on the duration of power failure.

5. The security control apparatus of claim 1, further comprising a memory configured to:
    store a life safety operating system, the life safety operating system configured to provide functionality associated with the life safety feature;
    store a life style operating system, the life style operating system configured to provide functionality associated with the life style feature; and
    the processor is further configured to run the life safety operating system and life style operating system in a virtual machine configuration.

6. The security control apparatus of claim 1, wherein the plurality of wireless communication protocols includes at least one of a ZigBee protocol, Z-Wave protocol and Wi-Fi protocol.

7. The security control apparatus of claim 1, wherein the remote communications are provided at least by at least one of an Ethernet communication link, Wi-Fi communication link and cellular communication link.

8. The security control apparatus of claim 1, wherein the cellular communication link is used for remote communications when at least one of the Ethernet communication link and Wi-Fi communication link is unavailable.

9. The security control apparatus of claim 1, wherein the user interface device is at least one of a keypad, mobile phone, tablet computer, personal computer and laptop computer.

10. The security control apparatus of claim 1, wherein the premise-based device is at least one of a sensor, video camera, thermostat and appliance.

11. A security control system, comprising:
    a user interface device, the user interface device configured to communicate local control data and configuration data;
    a security control device, the security control device in communication with the user interface device, the security control device including:
        a communication subsystem, the communication subsystem providing a plurality of communication protocols and being arranged to provide wireless communications with the user interface device and a premise-based device, the communication subsystem further arranged to provide remote communications with a remote monitoring center;
        a premise power supply, the premise power supply configured to supply power to the security control device;
        a back-up power supply, the back-up power supply configured to provide power to the security control device during failure of the premise power supply; and
        a processor, the processor configured to:
            use the communication subsystem to communicate with the user interface device to receive the local control and configuration data;
            use the communication subsystem to communicate data associated with at least one of a life safety feature and life style feature with the remote monitoring center;
            execute at least one life safety feature and at least one life style feature;
            monitor the premise power supply; and
            disable the at least one life style feature based at least in part on the monitoring.

12. The security control system of claim 11, wherein the at least one life style feature is disabled when the monitoring indicates power failure of the premise power supply.

13. The security control system of claim 12, wherein the at least one life safety feature remains enabled while the at least one life style feature is disabled.

14. The security control system of claim 12, wherein the executed at least one life style feature includes executing a plurality of life style features; and
    the disablement of the at least one life style feature occurs selectively from among the plurality of life style features based at least in part on the duration of power failure.

15. The security control system of claim 11, wherein the security control device includes a memory, the memory configured to:
    store a life safety operating system, the life safety operating system configured to provide functionality associated with the life safety feature;
    store a life style operating system, the life style operating system configured to provide functionality associated with the life style feature; and
    the processor is further configured to run the life safety operating system and life style operating system in a virtual machine configuration.

16. The security control system of claim 11, wherein the user interface device further includes a siren configured to be triggered based at least in part on the monitoring.

17. The security control system of claim 11, wherein the plurality of communication protocols includes at least one of a ZigBee protocol, Z-Wave protocol and Wi-Fi protocol.

18. The security control system of claim 11, wherein the remote communications are provided by at least one of an Ethernet communication link and a cellular communication link, the cellular communication link being used for remote communications during failure of the Ethernet communication link.

19. The security control system of claim 11, wherein the premise-based device is at least one of a sensor, video camera, thermostat and appliance.

20. A method for controlling features of a security system, the security system including a security control device in communication with a user interface device, the security control device includes a communication subsystem that provides a plurality of communication protocols, the communication subsystem being arranged to provide wireless communications with the user interface device and provide remote communications with remote monitoring center, the security control device further includes a premise power supply configured to supply power to the security control apparatus and a back-up power supply configured to provide power to the security control apparatus during failure of the premise power supply, the method comprising:

using the communication subsystem to communicate with the user interface device to receive local control and configuration data;

using the communication subsystem to communicate data associated with at least one of a life safety feature and life style feature with the remote monitoring center;

executing at least one life safety feature and at least one life style feature;

monitoring the premise power supply; and disabling the at least one life style feature based at least in part on the monitoring.

\* \* \* \* \*